United States Patent
Kesselman et al.

(10) Patent No.: US 10,126,032 B2
(45) Date of Patent: Nov. 13, 2018

(54) SYSTEM FOR COOLING AND METHODS FOR COOLING AND FOR CONTROLLING A COOLING SYSTEM

(71) Applicant: TestEquity LLC, Moorpark, CA (US)

(72) Inventors: Peter Kesselman, Moorpark, CA (US); John Riddle, Moorpark, CA (US)

(73) Assignee: TESTEQUITY LLC, Moorpark, CA (US)

( * ) Notice: Subject to any disclaimer, the term of this patent is extended or adjusted under 35 U.S.C. 154(b) by 189 days.

(21) Appl. No.: 14/965,626

(22) Filed: Dec. 10, 2015

(65) Prior Publication Data

US 2017/0167768 A1 Jun. 15, 2017

(51) Int. Cl.
*F25B 49/02* (2006.01)
*F25B 41/06* (2006.01)
*F25B 43/00* (2006.01)

(52) U.S. Cl.
CPC ............ *F25B 49/02* (2013.01); *F25B 41/067* (2013.01); *F25B 43/003* (2013.01); *F25B 49/022* (2013.01); *F25B 2600/0253* (2013.01); *F25B 2600/2515* (2013.01); *F25B 2700/21* (2013.01); *F25B 2700/2104* (2013.01)

(58) Field of Classification Search
CPC ................... F25B 41/067; F25B 49/02; F25B 2600/0253; F25B 2600/2503; F25B 2600/2515
See application file for complete search history.

(56) References Cited

U.S. PATENT DOCUMENTS

| | | | |
|---|---|---|---|
| 5,715,693 A * | 2/1998 | van der Walt | F25B 5/04 62/198 |
| 2005/0264253 A1* | 12/2005 | Ivankovic | B60H 1/00428 318/685 |
| 2007/0144190 A1* | 6/2007 | Temmyo | F25D 29/00 62/180 |
| 2008/0209930 A1 | 9/2008 | Taras | |
| 2009/0216384 A1* | 8/2009 | Thiessen | F25B 41/06 700/282 |
| 2011/0083384 A1* | 4/2011 | Russell-Smith | F24D 3/12 52/302.1 |

FOREIGN PATENT DOCUMENTS

| | | |
|---|---|---|
| CA | 1315999 | 4/1993 |
| EP | 1004463 A1 | 5/2000 |

* cited by examiner

*Primary Examiner* — Marc Norman
(74) *Attorney, Agent, or Firm* — Jeffer Mangels; Butler & Mitchell LLP; Brennan C. Swain

(57) ABSTRACT

A system for cooling and controlling a cooling system having a variable speed compressor, a condenser, a variable flow regulator, a metering device, an evaporator, and a refrigerant. The system includes controlling the speed of the variable speed compressor by transmitting a control signal to the variable speed compressor such that the speed of the variable speed compressor is based on the control signal and lowering the speed of the variable speed compressor results in a lower flow rate of the refrigerant and thus a reduced rate of cooling. The system also includes selectively opening or closing the variable flow regulator such that a closed variable flow regulator restricts the flow of the refrigerant through the evaporator and thus reduces the rate of cooling.

13 Claims, 3 Drawing Sheets

SYSTEM FOR COOLING AND METHODS FOR COOLING AND FOR CONTROLLING A COOLING SYSTEM

FIELD OF THE INVENTION

The present invention relates to a system for cooling, a method for cooling, and a method for controlling a cooling system, and more particularly to a system for cooling, method for cooling, and method for controlling a cooling system that uses a variable speed compressor and a metering device.

BACKGROUND OF THE INVENTION

Accordingly, a need exists for a system for cooling, method for cooling, and method for controlling a cooling system that uses a variable speed compressor and a metering device.

SUMMARY OF THE PREFERRED EMBODIMENTS

In accordance with a first aspect of the present invention there is provided a cooling system that has a variable speed compressor, a condenser, a variable flow regulator, a metering device, and an evaporator. A refrigerant path is defined from the variable speed compressor to the condenser to the variable flow regulator to the metering device to the evaporator and back to the variable speed compressor. In a preferred embodiment, there is also a controller, temperature sensor for measuring the temperature of an object or volume to be cooled. The controller receives a temperature reading from the temperature sensor and is operatively connected to the variable flow regulator and to the variable speed compressor. Preferably, the metering device is a capillary tube. In a preferred embodiment, the controller is a proportional-integral-derivative controller. Preferably, the controller has a first output and a second output. The variable flow regulator is operatively connected to the first output and the variable speed compressor is operatively connected to the second output.

In a preferred embodiment, the controller is configured to transmit a first control signal to the variable flow regulator and a second control signal to the variable speed compressor, and the variable speed compressor is configured to operate at varying speeds based on the second control signal. Preferably, the second control signal is a continuously variable direct current signal. In a preferred embodiment, the variable flow regulator is configured to turn on and off based on the first control signal. Preferably, the controller is further configured to calculate an error value based on the difference between the reading from the temperature sensor and a set point temperature. The controller is further configured to turn the variable flow regulator on or off based on the error value. The controller is further configured to transmit the second control signal based on the error value.

In accordance with another aspect of the present invention there is provided a method of selectively cooling a volume or object. A refrigerant is compressed using a variable speed compressor, changing the refrigerant from a vapor at a first pressure to a vapor at a second pressure that is greater than the first pressure. The refrigerant is then condensed from a vapor at a second pressure to a liquid at a third pressure. The flow of the refrigerant is selectively controlled using a variable flow regulator. The pressure of the refrigerant is then reduced from a liquid at a third pressure to a liquid at a lesser fourth pressure. Heat is absorbed from the volume or object using an evaporator, such that the refrigerant is changed from a liquid to a vapor, and such that the absorption of heat from the volume or object cools the volume or object. The temperature of the volume or object is measured. An error value is calculated based on the difference between the temperature of the volume or object and a set point temperature. The speed of the variable speed compressor is controlled based on the error value such that lowering the speed of the variable speed compressor reduces the flow rate of the refrigerant through the evaporator and thus reduces the rate of cooling of the volume or object. The variable flow regulator is selectively opened or closed based on the error value. Closing the variable flow regulator restricts the flow of the refrigerant through the evaporator and thus reduces the rate of cooling the volume or object.

In a preferred embodiment, a controller is used to calculate the error value, control the speed of the variable speed compressor based on the error value, and selectively opening or closing the variable flow regulator based on the error value. Preferably, the speed of the variable speed compressor is controlled by transmitting a control signal to the variable speed compressor. In a preferred embodiment, the control signal is a continuously variable direct current control signal.

In accordance with another aspect of the present invention there is provided a method of controlling a cooling system having a variable speed compressor, a condenser, a variable flow regulator, a metering device, an evaporator, and a refrigerant. In a preferred embodiment, the speed of the variable speed compressor is controlled by transmitting a control signal to the variable speed compressor. The speed of the variable speed compressor is based on the control signal. Lowering the speed of the variable speed compressor results in a lower flow rate of the refrigerant and thus a reduced rate of cooling. Preferably, the temperature of a volume or object being cooled by the cooling system is measured, and an error value based on the difference between a set temperature point and the temperature of the volume or object being cooled by the cooling system is calculated. In a preferred embodiment, controlling the speed of the variable speed compressor further includes setting the value of the control signal based on the error value and selectively opening or closing the variable flow regulator based on the error value. Preferably, the error value is calculated, the speed of the variable speed compressor is controlled, and the variable flow regulator is selectively opened or closed based on the error value are performed by a controller. In a preferred embodiment, the controller is a proportional-integral-derivative controller.

The invention, together with additional features and advantages thereof, may be best understood by reference to the following description.

DETAILED DESCRIPTION OF THE PREFERRED EMBODIMENTS

Figure 1:
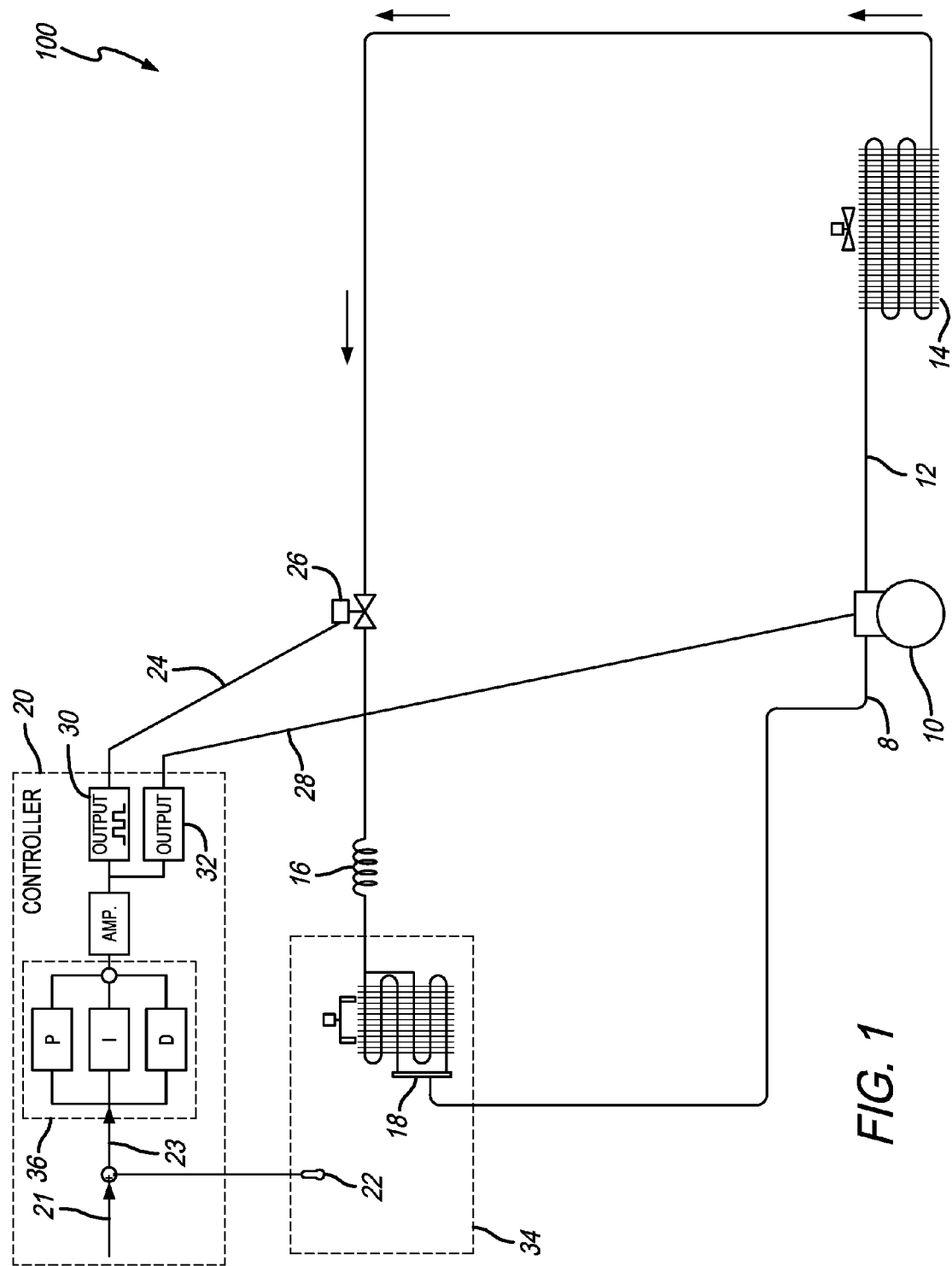
FIG. 1 is a schematic diagram of a cooling system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Figure 2:
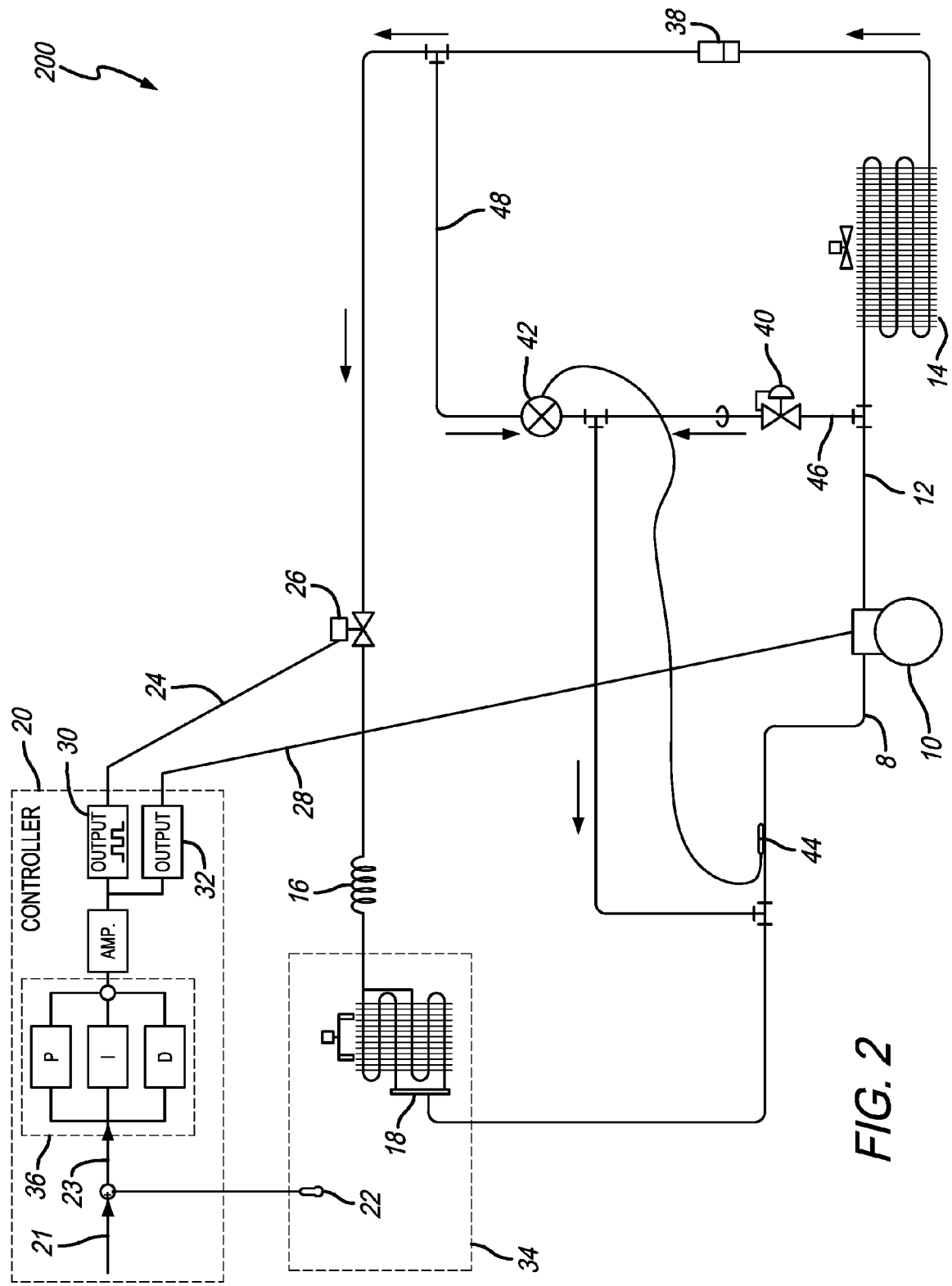
FIG. 2 is a schematic diagram of a cooling system in accordance with a preferred embodiment of the present invention.

Referring now to the drawings, wherein the showings are for purposes of illustrating the present invention and not for purposes of limiting the same, FIG. 1 is a schematic diagram of a cooling system 100 for cooling a volume or object 34 to be cooled in accordance with a preferred embodiment of the present invention. As shown in FIG. 1, in a preferred embodiment, a refrigerant circulates along a refrigerant path 12. It will be appreciated that the refrigerant can be a Freon, haloalkane, CFC, HFC, HCFC, or any other type of fluid refrigerant. It will also be appreciated that refrigerant path 12 may comprise any combination of pipes, tubes, and/or any other conduit capable of conveying a fluid refrigerant. A variable speed compressor 10 receives the refrigerant through its suction line 8. Suction line 8 is a portion of the refrigerant path 12 that feeds into the variable speed compressor 10. The variable speed compressor 10 compresses the refrigerant from a vapor at a first pressure to a vapor at a second pressure. The second pressure is greater than the first pressure. It will be appreciated that the variable speed compressor 10 may be a reciprocating, rotary screw, reciprocal, centrifugal, scroll, or any other type of compressor having a speed that can be varied. Preferably, as shown in FIGS. 1 and 2, the variable speed compressor 10 is configured to vary its speed in response to a continuously variable direct current signal. In other embodiments, the variable speed compressor 10 is configured to vary its speed in response to any type of signal, including a direct current, voltage, or digital signal. After exiting the variable speed compressor 10, the refrigerant then flows along the refrigerant path 12 to a condenser 14. The condenser 14 condenses the refrigerant from a vapor into a liquid at a third pressure. Preferably, as shown in FIG. 1, the condenser is an air-cooled condenser. However, it will be appreciated that the condenser 14 may be an air-cooled condenser, a liquid-cooled condenser, or any other type of condenser capable of removing heat that is given off when a vaporized refrigerant is liquefied. The refrigerant then flows through a variable flow regulator 26. In a preferred embodiment, as shown in FIG. 1, the variable flow regulator 26 is a solenoid valve. However, in other embodiments, the variable flow regulator 26 is a variable orifice modulating valve or any other component capable of selectively regulating the flow of the refrigerant. The refrigerant then flows through a metering device 16, which reduces the pressure of the refrigerant, thereby changing it from a liquid at a third pressure to a liquid at a fourth pressure. The fourth pressure is less than the third pressure. In a preferred embodiment, as shown in FIG. 1, the metering device 16 is a capillary tube. However, it will be appreciated that the metering device 16 can be a capillary tube, an expansion valve, or any other component capable of reducing the pressure of a refrigerant. The refrigerant then flows along the refrigerant path 12 and through an evaporator 18, which absorbs heat from the volume or object 34 being cooled and changes the refrigerant from a liquid to a vapor. This process cools the volume or object 34. The refrigerant then circulates along the refrigerant path 12 back into the variable speed compressor 10 to begin the process again.

As shown in FIG. 1, in a preferred embodiment, the operation of the cooling system 100 is managed by a controller 20. The controller 20 has at least one output and preferably a first output 30 and a second output 32. It will be appreciated that the first output 30 and the second output 32 can be any type of device, port, channel, conduit and the like capable of transmitting a signal. The first output 30 is operatively connected to the variable flow regulator 26. The second output 32 is operatively connected to the variable speed compressor 10. It will be appreciated that the first output 30 and the second output 32 can be operatively connected to the variable flow regulator 26 and variable speed compressor 10, respectively, via a wire, cable, Bluetooth, Wi-Fi, or any other conduit, medium, or protocol for transmitting a control signal. In a preferred embodiment, the controller 20 is a device such as a discrete process controller. It will be appreciated that the controller 20 can also be a programmable logic controller or implemented as one or more software modules. In a preferred embodiment, there is a temperature sensor 22 for measuring the temperature of a volume or object 34 that is being cooled. The volume or object 34 that is being cooled can be an object, enclosed volume, or open-air volume. The controller 20 receives a set point temperature 21, which is a desired temperature for volume or object 34. The controller 20 then calculates an error value 23 that represents the difference between the set point temperature 21 and the temperature measurement from temperature sensor 22.

In a preferred embodiment, the controller 20 calculates a first throttle value as a function of error value 23. Preferably, the first throttle value is a percentage value within a range of 0% to 100%. In a preferred embodiment, as shown in FIGS. 1 and 2, the controller 20 is a proportional-integral-derivative controller having a proportional-integral-derivative circuit 36, which calculates the first throttle value as a function of multiple calculations of error value 23 over time. However, it will be appreciated that the controller 20 can be a proportional, proportional-integral, proportional-derivative, integral, open-loop, or any other type of controller that can control the speed of the variable speed compressor 10 as a function of the error value 23.

Based on the first throttle value, the controller 20 sends a first control signal 24 via the first output 30 based on the first throttle value, to the variable flow regulator 26. In response to the first control signal 24, the variable flow regulator 26 selectively regulates the flow of the refrigerant through it and along the refrigerant path 12. The variable flow regulator 26 allows the refrigerant to flow through it when it is in the open state and restricts the flow of the refrigerant when it is in the closed state. This ultimately modulates the flow of the refrigerant through the evaporator 18 and thus the cooling capacity of the cooling system 100. In a preferred embodiment, the first control signal 24 has a value selected from two values, and the variable flow regulator 26 has either an open or closed state based on the value of the first control signal 24. In another embodiment, the value of the first control signal 24 can be selected from two or more values, and that in response to the first control signal 24, the variable flow regulator 26 can have more than two states, where each different state allows the refrigerant to flow through the variable flow regulator 26 at a different flow rate. It will be further appreciated that the first control signal 24 can be a continuously variable signal in response to which the variable flow regulator 26 can allow or restrict the flow of the refrigerant over a continuous range of flow rates. It will also be appreciated that the first control signal 24 can be a direct current voltage-mode, direct current current-mode, alternating voltage, digital, or any other type of signal by which the controller 20 can control the variable flow regulator 26.

Preferably, the controller 20 has a fixed time base that is predetermined. At the passing of a time interval equal to the fixed time base, the controller 20 recalculates error value 23 based on a new reading from temperature sensor 22, and controls the cooling system 100 as described herein.

In a preferred embodiment, the controller 20 controls the variable flow regulator 26 such that it is in the open state for a percentage of the fixed time base and in the closed state for the remainder of the fixed time base. In a more preferred embodiment, the controller 20 controls the variable flow regulator 26 such that it is in the open state for a percentage of the fixed time base that is equal to the first throttle value. By way of example, if the fixed time base is ten seconds and the first throttle value is 30%, the controller 20 controls the variable flow regulator 26 such that it is in the open state for three seconds and in the closed state for seven seconds. In a preferred embodiment, the fixed time base is within the range of one millisecond to eight hours. In a more preferred embodiment, the fixed time base is within the range of one second to one hour. In a most preferred embodiment, the fixed time base is within the range of about five seconds to about ten seconds.

In a preferred embodiment, based on the first throttle value, the controller 20 sends a second control signal 28 via the second output 32 to the variable speed compressor 10. In another embodiment, the controller 20 can calculate a second throttle value and based on the second throttle value, send the second control signal 28 via the second output 32 to the variable speed compressor 10. Preferably, in response to the second control signal 28, the variable speed compressor 10 selectively modulates its speed, thereby increasing or decreasing the flow of the refrigerant through it and along the refrigerant path 12. This ultimately modulates the flow of the refrigerant through the evaporator 18 and thus the cooling capacity of the cooling system 100. In a preferred embodiment, the variable speed compressor 10 has a maximum control input value which corresponds to a maximum speed and a minimum control input value which corresponds to a minimum speed. If the second control signal 28 has a value greater than or equal to the maximum control input value of variable speed compressor 10, the variable speed compressor 10 operates at its maximum speed. If the second control signal 28 has a value less than or equal to the minimum control input value of variable speed compressor 10, the variable speed compressor 10 operates at its minimum speed.

In a preferred embodiment, the value of the second control signal is calculated according to the following formula:

Value of Second Control Signal=Minimum Control Input Value+(Second Throttle value)×(Maximum Control Input Value−Minimum Control Input Value).

That is, the value of a minimum control input value of the variable speed compressor 10 plus a percentage of the difference between the variable speed compressor's 10 maximum and minimum control input values equal to the second throttle value. In a preferred embodiment, the second control signal 28 is a continuously variable signal having a value selected from a continuous range of values, in response to which the variable speed compressor 10 can operate at a speed within a continuous range of speeds. However, the value of the second control signal 28 can be selected from a discrete set of values, based on which the variable speed compressor 10 can operate at a speed selected from two or more speeds. In a preferred embodiment, the second control signal 28 is a direct current voltage-signal. However, it will be appreciated that the second control signal 28 can be a direct current voltage-mode, direct current current-mode, alternating voltage, digital, or any other type of signal by which the controller 20 can control the speed of the variable speed compressor 10.

An example of the operation of a preferred embodiment of the present invention follows. For purposes of this example, it is assumed that the controller 20 has a fixed time base of six seconds and that variable speed compressor 10 has a minimum input control value of 0.8V, a maximum control input value of 4.5V, a minimum speed of 2000 RPM, and a maximum speed of 6500 RPM. It is also assumed that the user has provided a set point temperature 21 of −20° C. and that the volume or object 34 has an initial temperature of −5° C. Finally, for purposes of this example, the controller 20 is a proportional controller having a proportional band of 5° C.

Initially, the controller 20 receives the temperature measurement of −15° C. from temperature sensor 21 and then calculates the error value 23, which is −5° C. Based on this error value 23 of −5° C., the controller 20 calculates a first throttle value of 100%. Based on this first throttle value of 100%, controller 20 then transmits a first control signal 24 via first output 30 to variable flow regulator 26. In response to first control signal 24, variable flow regulator 26 remains in the open state for 100% of the six second fixed time base, maximizing the flow of the refrigerant through the variable flow regulator 26. The controller 20 transmits the second control signal 28 with a value of 4.5V. Because the second control signal 28 has a value of 4.5V, which is equal to the maximum control input value of 4.5 V, the variable speed compressor 10 operates at its maximum speed of 6500 RPM.

Assuming, for purposes of this example, that after a time interval equal to the six second fixed time base has elapsed, the temperature of the volume or object 34 has dropped to −17.5° C., the controller 20 again calculates the error value 23, which is now −2.5° C. Based on this error value 23 of −2.5° C., the controller 20 calculates that the first throttle value is 50%. Based on this first throttle value of 50%, controller 20 then transmits the first control signal 24 via first output 30 to variable flow regulator 26. In response to the first control signal 24, the variable flow regulator 26 remains in the open state for three seconds and in the closed state for three seconds. The controller 20 also transmits the second control signal 28 with a value of 2.65V, (50% of the span from the minimum control input of 0.8V to the maximum control input of 4.5V of variable speed compressor 10). In response to the second control signal 28, the variable speed compressor 10 operates at a speed of 4250 RPM (50% of the span from its minimum speed of 2000 RPM to its maximum speed of 6500 RPM).

Assuming, for purposes of this example, that after another time interval equal to the six second fixed time base has elapsed, the temperature of the volume or object 34 has dropped to −19.5° C., the controller 20 again calculates the error value 23, which is now −0.5° C. Based on this error value 23 of −0.5° C., the controller 20 calculates that the first throttle value is 10%. Based on this first throttle value of 10%, controller 20 then transmits the first control signal 24 via first output 30 to variable flow regulator 26. In response to the first control signal 24, the variable flow regulator 26 remains in the open state for 0.6 seconds and in the closed state for 5.4 seconds. The controller 20 also transmits the second control signal 28 with a value of approximately 1.17V, (10% of the span from the minimum control input of 0.8V to the maximum control input of 4.5V of variable speed compressor 10). In response to the second control signal 28, the variable speed compressor 10 operates at a speed of 2720 RPM (10% of the span from its minimum speed of 2000 RPM to its maximum speed of 6500 RPM).

In another preferred embodiment, the controller 20 calculates a second throttle value as a function of error value 23. Preferably, the second throttle value is a percentage selected from a range of 0% to 100%. The controller 20 sends a second control signal 28 via the second output 32 to the variable speed compressor 10 based on the second throttle value. The controller 20 controls the cooling capacity of the cooling system 100 by varying both the first throttle value and the second throttle value. Preferably, the controller 20 initially controls only the speed of the variable speed compressor 10 to cool the volume or object 34 to maintain set point temperature 21. Then, if the cooling capacity of the cooling system 100 is not reduced sufficiently to maintain set point temperature 21, once the second throttle value drops below a predetermined second throttle threshold, then the controller 20 modulates the first throttle value. In another embodiment, when the second throttle value is equal to or less than the predetermined second throttle threshold, then the value of the second control signal 28 is equal to or less than the minimum control input value and the variable speed compressor 10 operates at the minimum speed.

Another example of the operation of another preferred embodiment in accordance with the present invention follows. Assuming that the predetermined second throttle threshold is 20%, as the controller 20 decreases the second throttle value from 100% to 20%, the variable flow regulator 26 remains in the open state and the speed of the variable speed compressor 10 is varied from its maximum speed to its minimum speed. As the second throttle value is decreased from 20% to 0%, the variable speed compressor 10 continues to operate at its minimum speed and the first throttle value is modulated from 100% to 0%, which modulates the variable flow regulator 26 from being in an open state for 100% of the fixed time base to being in a closed state for 100% of the fixed time base.

In another embodiment, the controller 20 has one output that transmits one or more control signals to control both the variable flow regulator 26 and variable speed compressor 10.

FIG. 2 is a schematic diagram of another cooling system 200 in accordance with another preferred embodiment of the present invention. As shown in FIG. 2, in a preferred embodiment, cooling system 100 also has a filter 38 that filters particulates out of the refrigerant. In a preferred embodiment, as the variable flow regulator 26 restricts the flow of the refrigerant through the refrigerant path 12, some or all of the refrigerant flows through a hot gas bypass line 46 and a hot gas bypass regulator 40, and then circulates back into refrigerant path 12 and into variable speed compressor 10. Preferably, there is also a cooling line 48 through which the relatively high pressure liquid refrigerant can be diverted through a suction line cooling thermostatic expansion valve 42. The suction line cooling thermostatic expansion valve 42 uses a suction line temperature sensor 44 to measure the temperature of the refrigerant in the suction line 8. In response to the temperature measurement from suction line temperature sensor 44, the suction line cooling thermostatic expansion valve 42 selectively regulates the flow of the relatively high pressure liquid refrigerant to cool the temperature of the refrigerant in the suction line 8.

Figure 3:
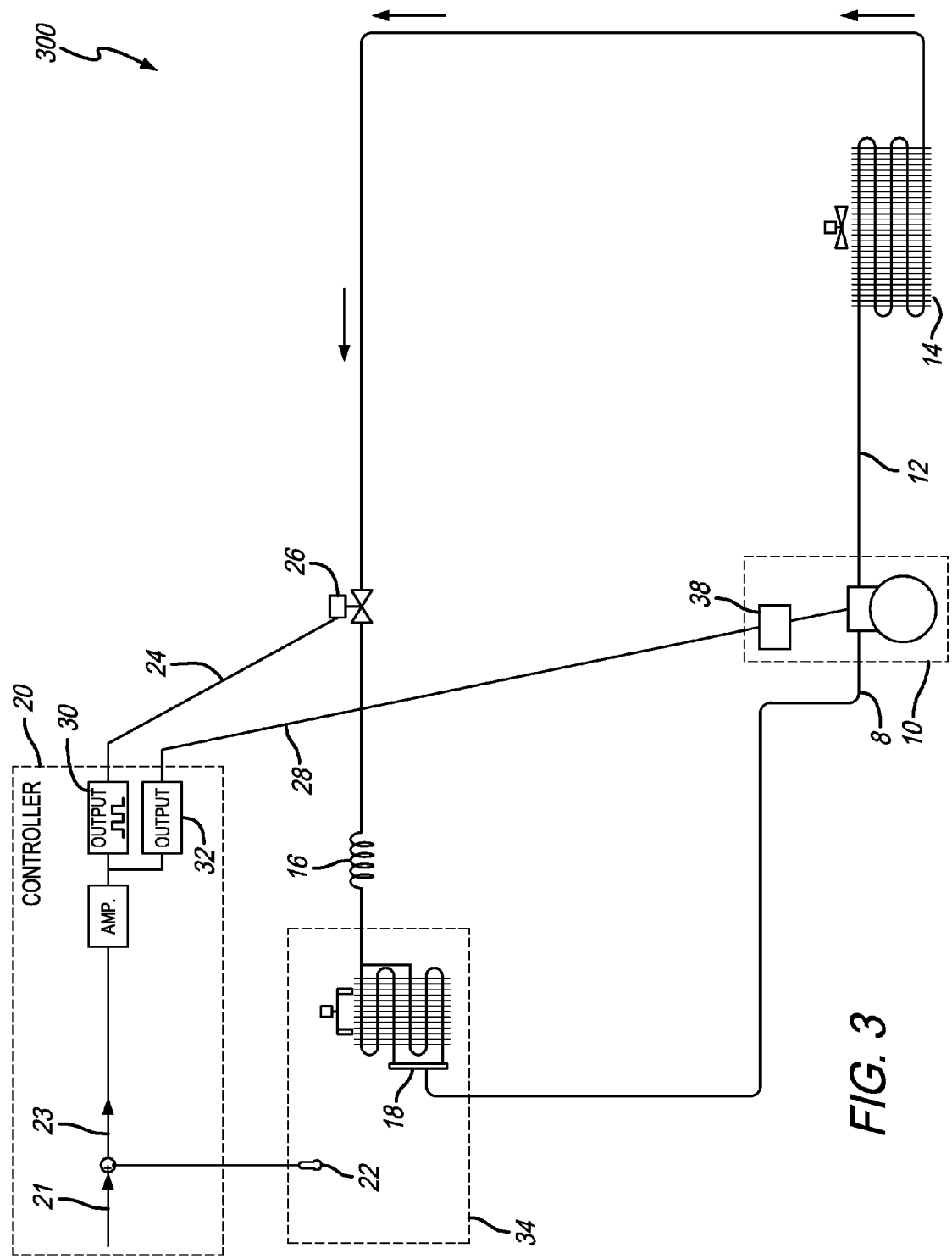
FIG. 3 is a schematic diagram of a cooling system in accordance with a preferred embodiment of the present invention.

FIG. 3 is a schematic diagram of another cooling system 300 in accordance with another preferred embodiment of the present invention. In a preferred embodiment, the second control signal 28 is a digital signal. Preferably, as shown in FIG. 3, the variable speed compressor 10 has speed processing circuitry 38 for processing the second control signal 28 and varying the speed of the variable speed compressor 10 based on the value of the second control signal 28. In a preferred embodiment, as shown in FIG. 3, the speed processing circuitry 38 is a component of the variable speed compressor 10. However, it will be appreciated that the speed processing circuitry 38 can be a device or component separate from the variable speed compressor 10. It will also be appreciated that the speed processing circuitry 38 can be a component of the variable speed compressor 10 that is located anywhere in the interior of or exterior to a housing of the variable speed compressor 10. Preferably, the controller 20 scales the value of the second control signal 28 sent to speed processing circuitry 38 to the range of speeds between the minimum and maximum speeds of the variable speed compressor 10.

FIGS. 1-3 show a cooling system 100 in accordance with a preferred embodiment in which the variable flow regulator 26 located along the refrigerant path 12 between the condenser 14 and the metering device 16. However, it will be appreciated that this placement of the variable flow regulator 26 in FIGS. 1-3 is merely exemplary, and that the variable flow regulator 26 can be located anywhere in the cooling system 100 as long as the cooling system 100 also includes a variable speed compressor 10. For example, in another preferred embodiment, the variable flow regulator 26 can be located along the refrigerant path 12 between the metering device 16 and the evaporator 18. In another preferred embodiment, the variable flow regulator 26 can be located along the refrigerant path 12 between the evaporator 18 and the variable speed compressor 10. In another preferred embodiment, the variable flow regulator 26 can be located on a bypass line that runs parallel to and bypasses metering device 16. In yet another preferred embodiment, the variable flow regulator 26 can be located on a bypass line to inject hot gas from the variable speed compressor 10 into the evaporator 18.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A cooling system comprising:
a variable speed compressor,
a condenser,
a variable flow regulator,
a metering device,
an evaporator, wherein a refrigerant path is defined from the variable speed compressor to the condenser to the variable flow regulator to the metering device to the evaporator and back to the variable speed compressor,
a temperature sensor that measures the temperature of an object or volume to be cooled, and
a controller operatively connected to the variable flow regulator and to the variable speed compressor, wherein the controller is configured to receive a temperature reading from the temperature sensor,
wherein the controller is configured to transmit a first control signal to the variable flow regulator and to transmit a second control signal to the variable speed compressor, such that a speed of the compressor is varied and the variable flow regulator is proportionally controlled to modulate a flow of refrigerant through the evaporator, wherein the controller is configured to calculate an error value based on the difference between the reading from the temperature sensor and a set point temperature, wherein the controller is a proportional-integral-derivative controller having a proportional-integral-derivative circuit that calculates a first throttle value as a function of multiple calculations of the error value over time, wherein based on the first throttle value, the controller transmits the first control signal, based on the first throttle value, to the variable flow regulator, wherein in response to the first control signal, the variable flow regulator selectively regulates the flow of refrigerant through the variable flow regulator and along the refrigerant path to the evaporator, and wherein the controller is further configured to transmit the second control signal based on the error value.

2. The cooling system of claim 1 wherein the system includes a single evaporator.

3. The cooling system of claim 2 wherein the metering device is a capillary tube.

4. The cooling system of claim 2 wherein the controller is a proportional-integral-derivative controller that simultaneously controls the variable flow regulator and varies the speed of the variable speed compressor.

5. The cooling system of claim 4 wherein the second control signal is a continuously variable direct current signal.

6. The cooling system of claim 1 wherein the variable flow regulator includes more than two states, and wherein each different state allows the refrigerant to flow through the variable flow regulator at a different flow rate.

7. The cooling system of claim 1 wherein the controller has a predetermined fixed time base, wherein when a time interval equal to the fixed time base passes, the controller recalculates the error value based on a new reading from the temperature sensor.

8. The cooling system of claim 7 wherein the controller controls the variable flow regulator such that the variable flow regulator is in an open state for a percentage of the fixed time base and is in a closed state for the remainder of the fixed time base.

9. The cooling system of claim 7 wherein the controller controls the variable flow regulator such that the variable flow regulator is in an open state for a percentage of the fixed time base that is equal to the first throttle value.

10. The cooling system of claim 9 wherein the controller is configured to calculate a second throttle value, and wherein the second control signal is based on the second throttle value.

11. The cooling system of claim 1 wherein the second control signal is a digital signal, and wherein the variable speed compressor includes speed processing circuitry for processing the second control signal.

12. A cooling system comprising:
a variable speed compressor,
a condenser,
a variable flow regulator,
a metering device,
an evaporator, wherein a refrigerant path is defined from the variable speed compressor to the condenser to the variable flow regulator to the metering device to the evaporator and back to the variable speed compressor,
a temperature sensor that measures the temperature of an object or volume to be cooled,
a hot gas bypass line having an entrance positioned between the variable speed compressor and the condenser, and an exit positioned between the evaporator and the variable speed compressor, wherein when the variable flow regulator restricts a flow of refrigerant through the refrigerant path, some or all of the refrigerant flows through the hot gas bypass line and circulates back into the refrigerant path, and
a controller operatively connected to the variable flow regulator and to the variable speed compressor, wherein the controller is configured to receive a temperature reading from the temperature sensor,
wherein the controller is configured to transmit a first control signal to the variable flow regulator and to transmit a second control signal to the variable speed compressor, such that a speed of the compressor is varied and the variable flow regulator is proportionally controlled to modulate a flow of refrigerant through the evaporator.

13. The cooling system of claim 12 further comprising a refrigerant cooling line between the condenser and the variable flow regulator, wherein the cooling line includes a thermostatic expansion valve and a second temperature sensor, and wherein the cooling line is in flow communication with the hot gas bypass line.

* * * * *